United States Patent Office.

JOSEPH O. KLIMSCH, OF VIENNA, AUSTRIA-HUNGARY, ASSIGNOR TO THE SOCIETY FOR THE MANUFACTURE OF WOOD PULP, AT GRELLINGEN.

METHOD OF TREATING FIBROUS MATERIALS FOR PAPER-STOCK, &c.

SPECIFICATION forming part of Letters Patent No. 256,436, dated April 11, 1882.

Application filed February 24, 1882. (No specimens.)

*To all whom it may concern:*

Be it known that I, JOSEPH O. KLIMSCH, of Vienna, Austria-Hungary, have invented a new and useful Improvement in Treating Fibrous Materials to Render them Suitable for Paper-Stock and for other Purposes, of which the following is a specification.

The invention relates more particularly to a process for treating fibrous material—such as wood, straw, alpha, or other fibrous material of vegetable or animal origin—and has for its object to remove from these materials the incrustating and other foreign substances contained therein in order to render such materials more suitable for their further treatment for industrial purposes.

In carrying out my invention I fill the material to be treated, together with a watery solution of ammonia of about 0.95 specific gravity (more or less) into a vessel, which afterward is closed hermetically and its contents boiled with or without pressure, the latter of about four to five atmospheres, more or less. The period during which the mass in the vessel is boiled under pressure varies according to the nature of the fiber to be treated. In general, a period of four to eight hours will be suitable. The boiling process being terminated, the vessel is opened and the contents removed therefrom, when the fibrous material has in a high degree been freed from its incrustating and other foreign substances. If the fiber treated in the said manner has contained resin or the like substances, this resin is not materially decomposed by the ammoniacal solution, but only dissolved, and is separated from the solution if the latter has become cool, when the resin will collect in bubbles on the surface of the liquor, and can easily be removed therefrom and placed on the market.

If by one boiling process with the ammoniacal liquor the fiber has not sufficiently been disincrustated, the process is repeated once or more until the desired degree of disincrustation has been obtained.

Having now described my said invention and the manner in which the same is to be carried out in practice, I wish it to be understood that I do not claim the use of ammoniacal liquor in combination with other alkaline materials; but

What I do claim as my invention is—

The process of freeing fibrous materials of any kind from its incrustating and other foreign substances by boiling them with a watery solution of ammonia in a closed vessel with or without pressure, substantially as herein described.

In testimony whereof I have signed my name to this specification in the presence of two subscribing witnesses.

JOS. O. KLIMSCH.

Witnesses:
FRANZ HAPLACHER,
HENRY HOFOCKER.